Dec. 6, 1960 A. SCHREIBER 2,963,430
PROCESS FOR IMPROVING THE COMBINED MECHANICAL AND
BIOLOGICAL CLARIFICATION OF TOWN SEWAGE
Filed Oct. 17, 1956 4 Sheets-Sheet 1

Fig. 1

Fig. 6
VII-IV-VI

Fig. 5
VIII-IV

Dec. 6, 1960 A. SCHREIBER 2,963,430
PROCESS FOR IMPROVING THE COMBINED MECHANICAL AND
BIOLOGICAL CLARIFICATION OF TOWN SEWAGE
Filed Oct. 17, 1956 4 Sheets-Sheet 3

Dec. 6, 1960 A. SCHREIBER 2,963,430
PROCESS FOR IMPROVING THE COMBINED MECHANICAL AND
BIOLOGICAL CLARIFICATION OF TOWN SEWAGE
Filed Oct. 17, 1956 4 Sheets-Sheet 4

United States Patent Office 2,963,430
Patented Dec. 6, 1960

2,963,430

PROCESS FOR IMPROVING THE COMBINED MECHANICAL AND BIOLOGICAL CLARIFICATION OF TOWN SEWAGE

August Schreiber, 45a Bahnhofstrasse, Hannover-Vinnhorst, Germany

Filed Oct. 17, 1956, Ser. No. 616,405

3 Claims. (Cl. 210—4)

The invention relates to installations and to processes for the combined mechanical and biological purification of town sewage or the like.

It is known to purify sewage of the said type by the fact that initially the solids contained in the sewage are liberated by sedimentation or by other mechanical treatment (this method is hereinafter referred to as "mechanical purification") and that thereafter the organic impurities dissolved in the sewage are decomposed by the activity of microorganisms in the presence of oxygen (air), if necessary for formation of solids which can settle, and this method is hereinafter referred to as "biological purification."

For the mechanical purification, clarifying or settling tanks and other containers are used in which the stream of flowing sewage is reduced to such an extent that the solids are separated out by sedimentation or accumulation at the surface of the water. The sludge which is separated out is converted in separate containers or chambers by a digestion process into a residue which is practically odourless.

For the biological purification, there are frequently used so-called trickling filters, that is to say, containers which are loaded with a filling material in the form of lumps, above which the sewage is distributed so that it flows in thin layers over the filling material, while simultaneously air flows upwardly through the filling in the container.

Such trickling filter installations are usually very expensive to manufacture. It is true that less expensive trickling filters exist which can be loaded to a high degree, but the desired purification effect is only partially achieved thereby.

It is also known that the activated sludge being formed in the biological clarification can be mixed with the initial sewage to be purified and then aerated, whereby important advantages are produced. This working method is designated as the "activated sludge process." The prior known sewage purifying plants designed for such processes have however the disadvantage of numerous and long sludge and aeration pipes, sludge return pipes, air compressors and pumps, that is to say, comparatively sensitive working parts and the disadvantage of high running costs due to the aeration of the sewage, the need for a large amount of space, the heavy odour and the unsatisfactory appearance.

One important object of the invention is concerned with improving the mechanical and especially the biological purification action, in which the biological purification is carried out either in trickling filters or by the activated sludge process, so that such installations can be erected and operated at substantially lower cost and disadvantages due to odour and appearance are reduced.

The principle of the invention consists in that the activated sludge being formed by the clarification in the biological purification treatment and the fresh sludge from the mechanical purification treatment by the working chamber of the previous purifying tanks are moved directly in a sludge accumulator or digestion chamber disposed at the entrance for the initial sewage and the biological working chamber is charged in an adjustable manner and uniformly for 24 hours a day.

Further objects and features of the invention will be apparent from the following description of various constructional forms of the invention, which are illustrated in the drawings, wherein Fig. 7 is a vertical section, Fig. 9 is a vertical section.

The combined mechanical and biological purification, carried out with the use of the trickling filter process, can be satisfactorily carried out in a closed construction, as shown in Figs. 1 to 6. The initial mechanical purification, the pump sump and the final clarifying tanks preferably take up seperal chambers, which are formed by partitions in a substantially cylindrical container, and the biological purification is effected in a trickling filter, the walls of which form an upward extension of the walls of the mechanical purification devices. The purification of the sewage with throttling of the flow of the latter can be carried out in such manner that by periodic damming of the sewage, the sludge is moved from the segmental settling chamber or chambers into a sludge chamber forming part of the mechanical purification, and that an irregular supply of the sewage due to the latter being dammed is compensated for in the mechanical purification, so that the sewage is uniformly supplied to the adjoining biological purification section, the sludge being formed in the biological purification section being separated out in a final clarifying tank and supplied with the sludge from the mechanical purifying section into the sludge digestion chamber.

Unlike the known sewage purifying plants, in which separate structures are provided for the mechanical purification for the pumping assembly, for the biological trickling filters and for the final clarifying tanks, all the clarifying chambers and the pump assembly are arranged in a single chamber according to the invention. Adjustable return devices for the sewage and sludge move the sludge from the mechanical purification section ahead of and following the biological purification section into the sludge digestion chamber disposed at the inlet. The compact circular construction saves building material and connecting pipes and only takes up a small amount of space. The automatic operation can be adjusted to the purification requirements as regards amount and concentration of the sewage. Apart from the necessary elimination of sludge the plant requires practically no attention, apart from the usual supervision.

Figure 1:
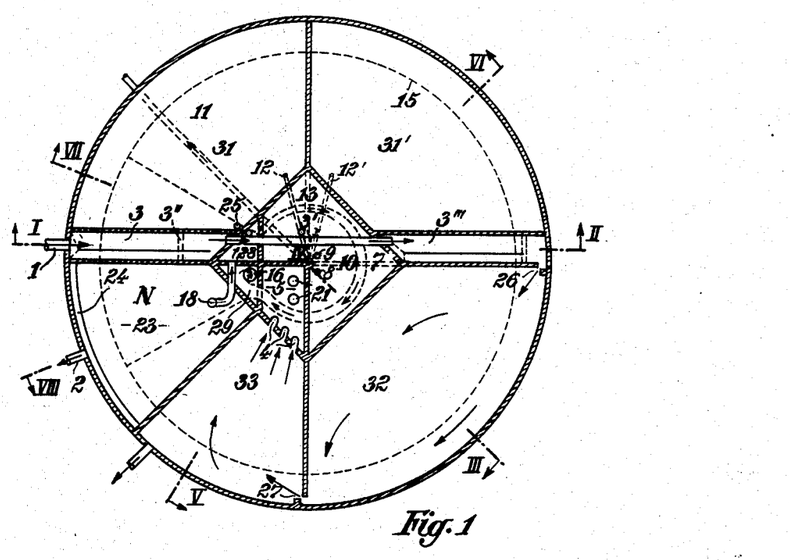
Fig. 1 is a horizontal section through a combined mechanical and biological purification plant for sewage according to the invention.
Figure 2:
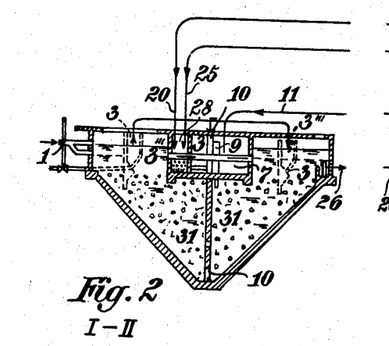
Fig. 2 is a vertical section through the lower part of the installation on the line I—II of Fig. 1.
Figure 3:
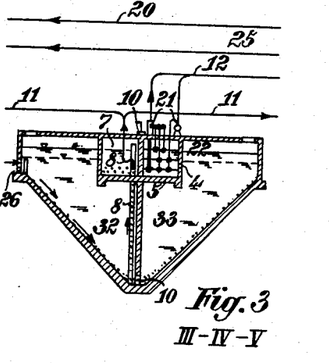
Fig. 3 is a vertical section on the line III—IV—V of Fig. 1.

The sewage flowing at 1 into the clarifying arrangement in Figs. 1 and 2 is initially purified mechanically in four chambers 31, 31', 32, 33 and then passes into the section 5, from which the waste water is removed periodically or continuously by means of pumps in such manner that the accumulation of waste water obtained in one day is conveyed to the biological purifying plant (trickling filter, Fig. 6), this amount being distributed uniformly over 24 hours. Fluctuations in the supply of sewage are compensated for by raising or lowering the water level in the chambers 31, 32, 33. During the main flowing period by day, the water level is therefore raised, while it falls again with the smaller supply by night. In this way, always the same water level is reached after 24 hours. Due to the daily rise and fall of the water level, the sludge is moved from the settling chambers 32, 33 into the sludge-storage and digestion chambers 31. The sludge from the final clarifying tank 23 also passes into the sludge digestion chambers 31. Therefore, all the sludge, i.e. both the sludge suspended in the initial water and also the sludge formed in the biological trickling filter, is returned opposite to the general direction of flow of the waste water into the digestion and storage chambers 31 disposed at the inlet.

For the initial mechanical purification, the waste water flows through the supply pipe 1 into the so-called first Imhoff settling trough 3, which is arranged above the first chamber 31 of the mechanical plant. The inlet is so designed that also with different level, a horizontally directed flow is assured and discharge of the water through the sludge slot 3" of the Imhoff trough 3 into the digestion chamber 31 is largely avoided. The waste water then passes through the connecting pipe 3' into a second Imhoff trough 3''' arranged above the second chamber 31'. In the Imhoff troughs the large floating and submerged substances are separated out from the waste water or sewage and stirring of the sludge in the digestion chamber 31 disposed therebeneath is avoided. All the sludge of the complete installation is accumulated in the two chambers 31 and 31' and is digested; it is removed at short time intervals for further treatment.

From the Imhoff trough 3''', the sewage flows through a vertical narrow slot 26 to the chamber 32 and then to the chamber 33, which is connected to the latter by a vertical slot 27. The finer sludge particles are separated out in the chambers 32 and 33. The said particles travel from the base of the chambers 32 and 33 through the pipe 8 provided with a non-return flap and into the section 7 and from the latter through a pipe 9 into the chamber 31'.

By means of the narrow vertical slots, there is obtained a substantially uniform horizontal flow of the water in the chambers and the settling of the sludge particles. The settling operations are not influenced by changes in the water level. The subdivision into a plurality of settling prevents lumpy constituents floating in the sewage from reaching the pumps and interfering with the operation thereof.

From the chamber 33, the sewage passes into the section 5 by way of the pipes 4, the inlet openings of which are below the water level. The water level in the chambers 31, 31', 32 and 33 and in the section 5 is substantially the same. From the section 5, the waste water is forced by the pump 21 into the rotating distributor 19 (Fig. 6) and is uniformly distributed by the latter on top of the biological settling filter 14, which is arranged above the chambers 31 and 23 and has an operating space 17. That part of the settling filter 14 which is disposed above the operating space 17 has a smaller height and consequently a smaller purifying action. The water from the lower portion of the settling filter is consequently collected on the top of the operating chamber 17 and flows through a pipe line 25 to a shaft 28. From the latter it flows through the connecting pipe 3', the Imhoff trough 3''' and the slot 26 to the chamber 32. The purified waste water from the remaining part of the settling filter 14 flows to a collecting trough 13 and passes by way of descending pipe into the chamber 23.

In order to maintain best possible biological conditions in the settling filter 14 and in order to flush out the sludge, a pipe which can be shut off is provided between the chamber 23 and the section 5. If the settling filter is to be flushed with both pumps, the slide valve is opened and the settling filter is only supplied with water which has been purified biologically and freed from sludge in the final clarifying tank 23.

For the final mechanical purification, the tank 23 is formed at its centre with a depression into which the sludge formed in the settling filter 14 is adapted to drop owing to its greater weight. The waste water rises in the final clarifying tank 23 and flows over a sill 24 into a collecting trough and discharges from the installation by way of the discharge pipe 2 and can be released into a river course.

On starting operation, a granular material and reaction product are flushed out of the trickling filter filling 14. In order to prevent interruptions in the operations due to this granular material, the waste water coming from the trickling filter 14 has the sand removed therefrom before it flows to the final clarifying chamber 23. This is effected by the waste water being conducted from the collecting trough 13 to a clarifying chamber 29. The waste water or sewage is introduced into the latter until up to about half the height of the clarifying chamber, so that it must rise still further before it can pass through the discharge pipe 16 into the bottom recess in the final clarifying tank 23. As it flows through the chamber 29, all the sanded constitutents are deposited. The mixture of waste water and sludge from the final clarifying tank is supplied to the chamber 28 in order to have the sand removed therefrom. The discharge from the lower portion of the trickling filter also has sand removed therefrom in the chamber 28.

For the return of the sludge, the waste water purified in the trickling filter 14, as long as it is not able to discharge in the tank 23 by way of the sill 24, is conducted through the device 18 with the sludge accumulating in the depression of the tank 23 and by way of the sand chute 28, the connecting pipe 3' and the Imhoff trough 3'' into the chambers 32, 33. The sill 24, the overflow of the device 18 and the delivery quantity of the pumps 21 are so adjusted that only about a 24th of the daily sewage discharges every hour by way of the sill 24. The remainder of the biologically purified waste water and the sludge being formed are conducted from the tank 23 by way of the connecting pipe 37 and the Imhoff trough 3'' into the chamber 31' and the chambers 32, 33. By this means, the waste water or sewage of the mechanical purifying devices is diluted, a sludging of the trickling filter 14 is avoided and a high loading of the biological trickling filter is rendered possible. Furthermore, the sludge of the final clarifying tank 23 is constantly supplied to the mechanical purification section.

In order that not too much of the waste water or sewage which has already been purified biologically does not come into contact with digested sludge, the sludge resulting from the purifying chambers 32, 33 is returned through the sludge pipes 8, 9 and the sludge shaft 7 into the chamber 31' when there is a change in the water level. With increasing water level, the sludge is forced through the pipe 8 from the bottom of the chambers 32 and 33 in the sludge shaft 7. The rising pipe 8 is provided in the shaft 7 with a non-return flap or valve. Leading from the shaft 7 is a descending pipe 9 leading to the upper portion of the chamber 31'. In the shaft 7, this pipe 9 is also provided with a non-return flap or valve. When the water level is descending, the sludge therefore flows from the shaft 7 and by way of the pipe line 9 to the chamber 31'. If the surface of the sludge shaft 7 is given sufficiently large dimensions and if the difference between the highest and lowest water levels is sufficiently large, all the sludge forming in the chambers 32 and 33 will be moved into the chamber 31'.

A manual pump (not shown) is preferably provided in order that the sludge can if necessary be moved into the chamber 31'. It is also advantageous to install a water jet pump on the sludge rising pipe 8, it being possible by means of this pump to determine whether there is an accumulation of sludge on the bottom of the chamber 32 and to remove the same.

When the water level in the chambers 32 and 33 drops to its lowest level, determined by the upper edge of the pipe bend 4 disposed in the compartment 5, the supply to the compartment 5, from which the pumps draw liquid, is shut off. The operating pump continues to work, however, and empties the compartment 5 until the pump is switched off by means of a float member (not shown). If the water level in the compartment 5 rises to the upper edge of the pipe bend 4, the pump of the installation is automatically switched on again.

Since the compartment 5 is small in relation to the settling chambers 32 and 33, the trickling filter 14 is always charged for a short period with sewage in the event that, for example, in the hours of the morning, the sewage has been almost completely pumped out of the installation and the flow to the clarifying plant is only quite small. Due to this continuous operation, good biological conditions are produced and in addition the danger of freezing is eliminated.

If the water level in the chambers 32, 33 and the compartment 5 reaches a predetermined level, the reserve pump is switched on by a float. This pump then runs continuously until the water level in the compartment 5 and the chambers 32, 33 has dropped by about 2 to 3 centimetres. However, the installation pump is also continuing to operate during this period. During this time, the trickling filter 14 is additionally charged with 0.8 cubic metre for each square metre of its surface and per hour. This operational condition provides a loading of 6 to 8 cubic metres of sewage for each cubic metre of filling in the trickling filter 14, based on 24 hours per day.

The fact that the amounts of sewage is not always entirely constant on different days can be compensated for at will either by the plant pump being switched off for a short period when the lowest water level is reached or by the reserve pump being switched on for a short period when the highest water level is reached.

For the removal of sludge, a pipe is fitted at the point of intersection of the partitions, that is to say, substantially on the central axis of the installation. Fitted into the lowermost part of the sludge-removing pipe is a rotary slide valve. It is actuated by a sliding rod extending almost into the central shaft of the trickling filter 14. This pipe is sealed at the top end by means of a flange and stuffing box in relation to the rising pipe and is provided with a rotatable lever.

If the sludge which has settled in the chamber 31 is circulated by pumping about once every month, the sludge digestion is considerably accelerated and settlement of sand is avoided; raking and sand collection can consequently be dispensed with in many cases.

The sludge removal pipe extending as far as the lowest point of the bottom of the chambers 31 and 31' opens by means of a closure branch below the water level into a sludge-removing shaft or sludge-drying bed provided outside the installation which is illustrated. On being pumped from the sludge-removing shaft, the sludge from the chambers 31, 31' of the initial purifying section flows automatically into the shaft. If the sludge-drying beds are disposed at a higher level than the water level of the initial purification section or if the sludge is to be pumped into a sludge discharge truck disposed at a higher level, this can also effected by means of a pump or by means of compressed air.

The small round structure which is advantageously built up of shaped concrete bricks and which contains the installation according to Figs. 1 to 6, is inconspicuous and closed. This arrangement and also the movement of the sludge prevents odours being produced. The clarifying plant can consequently be erected in the vicinity of houses and, owing to the fact that it takes a small amount of space, it can also be erected on ground adjacent industrial and commercial buildings.

In certain circumstances, the sewage purification plant according to Figs. 1 to 6 can also advantageously be operated as follows:

The mixture of waste water and sludge coming from the trickling filter 14 and enriched with oxygen is removed from the depression in the chamber 23 and passed directly into the compartment 5. In addition, sewage which has been initially purified mechanically is conducted from the chambers 32, 33 into the compartment 5, and also the partially purified discharge from the low trickling filter above the working chamber. The liquid mixture is then supplied from the compartment 5 to the trickling filter 14.

The ratio between the amount of the waste water which has been initially purified mechanically and the amount of the waste water mixed therewith and coming from the trickling filter 14, and the aeration of the water in the trickling filter 14, are so chosen that the sludge formed in the trickling filter is not a polysaprobic sludge which smears or soils the surface of the filling in the said filter, but the sludge is mesosaprobic and can easily be flushed off the said filling, for example, by periodic charging of the trickling filter 14. Some of the waste water extracted from the said filter 14 flows from the chamber without sludge over the sill 24, while the residues of the water in the sludge pass into the compartment 5 and are mixed therein with initial sewage which has only been initially purified mechanically. Some of the sludge is continuously or intermittently extracted from the outlet of the trickling filter 14 and moves as excess sludge into the chambers 31 in order that the sludge concentration of the waste water being circulated is not allowed to increase to an impermissible degree.

However, it is also possible for the quantity of circulating sludge to be regulated by actuating the pumps. For example, if the pumps are operated less frequently, some of the waste water flowing from the low portion of the trickling filter 14 passes from the compartment 5 and some of the concentrated mixture of sludge and water from the depression of the tank 23 pass into the chamber 33. It is true that actuation of the pump causes this sludge and water mixture to be sucked in at the same time, but this sludge has in the meantime sunk and then passes by way of the depression in the chambers 32 and 33 and the sludge return into the sludge compartments of the chambers 31.

The working method of the clarifying installation as last described in the foregoing is practically a purification process which is known as an "activated sludge process" in the sewage industry, in which the aeration tanks are replaced by the trickling filters.

In the known installations in which this "activated sludge process" is carried out, such an amount of untreated or initially purified sewage and air is in principle supplied to a container filled with activated sludge that the organic substances contained in the sewage are absorbed by the micro-organisms as food and are reacted. For this purpose, it was the practice hitherto for the air to be supplied at the bottom, in the middle or even at the surface through fixed aeration devices arranged in the container in such manner that the sludge is kept constantly moving by streams of water and the settling of the sludge is prevented. The container was of such a form that the sewage and sludge mixture was always supplied to the aeration devices again and aerated. In special cases, motor-driven stirrer mechanisms are also installed in order not to allow the activated sludge to settle and be brought up to the aeration devices.

Figures 4, 13, 14, 15:
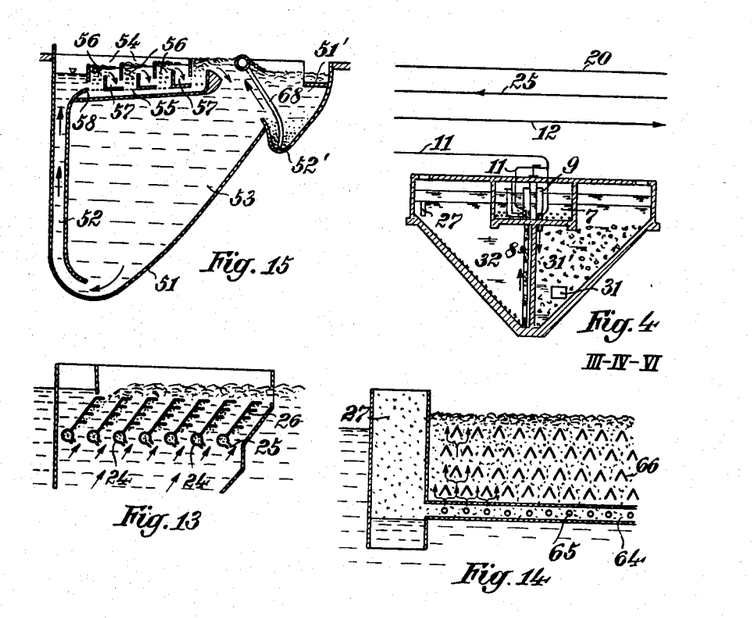
Fig. 4 is a vertical section on the line III—IV—VI of Fig. 1.
Fig. 13 is a vertical section through an aerating device.
Fig. 14 is a vertical section through the device according to Fig. 13, in a plane extending at right-angles to the mean plane of Fig. 13.
Fig. 15 is a diagrammatic vertical section through an aerating tank of an activated sludge installation.
Figure 5:
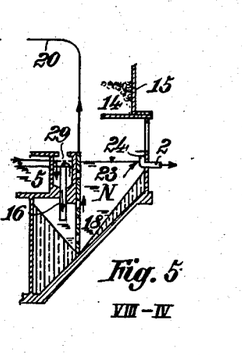
Fig. 5 is a vertical section through a part of the installation on the line VIII—IV of Fig. 1.
Figure 6:
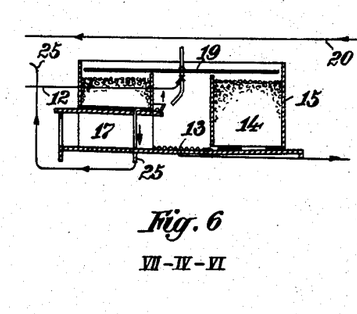
Fig. 6 is a vertical section of the trickling filter for the biological purification and arranged in the upper part of the installation according to Fig. 1, the section being on the line VII—IV—VI.

Fig. 15 shows an aeration device according to the invention with aeration passages arranged one after the other, for use in an aeration tank.

From the centrally depressed base 51, the sewage is guided upwardly through a guiding passage 52. The passage or duct 52 is in communication with the tank space 53 by way of an aeration space 54 which is separate from the contents of the tank. In the aeration space 54, the sewage is forced through small baffles so as to flow in an upwardly and downwardly zig-zag flow into the tank space 53. Underneath each section 56 of the aeration space 54 in which the sewage must travel upwardly, there are provided air-inlet openings 55 through which the air is supplied in finely distributed form from the air duct 58, which is connected to an air pump (not shown). Above the air-inlet openings, the water-sludge mixture to be aerated becomes specifically lighter due to the injected air, so that the level of the filling is higher than the water level in the adjoining space 57 with a downwardly directed flow. The air bubbles escape from the chamber 56. The waste water after deaeration flows into the next following space or chamber 57 and from thence into the lower part of the next following chamber 56. In the latter, air is again forced in and thereby a raising of the water level is produced. Due to these measures, the waste water level in the guide duct 52 is lowered and the water level of the overflow from the aeration device is raised and a circulation of the contents of the tank is produced.

Figs. 14 and 15 show another aeration device with juxtaposed aeration ducts in section. The baffle plates 66 are set at an inclination and are serrated or of sawblade form on the underside, so that the air bubbles ascending from the air supply pipe 64 through the openings 65 are broken up by the serrations. By this means, each air bubble is compelled to move through a longest possible zig-zag path and to be frequently reformed.

Both arrangements with aeration ducts arranged following or adjacent one another can be arranged in the aeration tank so as to be rigid, floating or movable. With a movable arrangement, the bottom of the tank can be kept flat and the guide duct which leads from the said bottom to the aeration chamber can be formed by tubes or boxes. The guide duct can be provided at the bottom end with a sludge shield, by which any sludge possibly settling on the bottom is positively supplied to the guide duct. The aeration chamber, including the guide duct, can be arranged by means of adjustable air cushions to float on or in the surface of the water.

Figure 7:
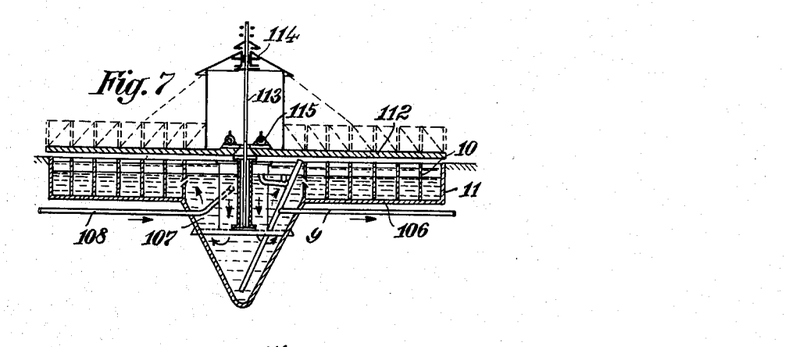
Figure 8:
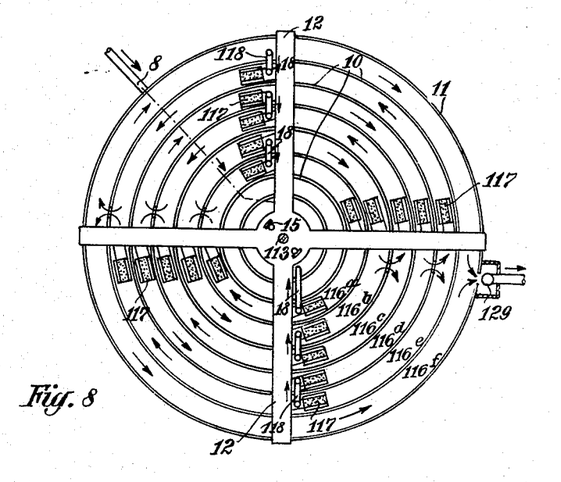
Fig. 8 is a top plan view of a combined mechanical and biological purification plant, in which the activated sludge process is employed.

One preferred constructional form in which the aeration devices are installed so as to float and move in the aeration tank and the excess sludge is moved in countercurrent through the activated sludge installation, is shown diagrammatically in Figs. 7 and 8.

Fig. 7 is a cross-sectional view of an activated sludge plant, which is formed centrally with a funnel-shaped tank for the removal of the coarse sludge from the waste water, the said tank being surrounded concentrically by a plurality of circular tanks. Fig. 8 shows a plan of this installation. In the example illustrated, six such circular tanks are provided. The five innermost tanks are aeration tanks while the outermost one is the final clarifying tank. The sludge to be purified flows progressively in an outward direction through the said tanks, which communicate with one another by means of a supply opening and discharge opening in each case. A four-armed bridge 112 is adapted to rotate above these circular tanks and above the partitions thereof. The pivot 113 of the bridge 112 is supported in the central funnel-shaped tank section and serves as the guiding means for the complete rotatable bridge. Sliding contacts are arranged at 114 and by means thereof electric energy is supplied to the rotating bridge. Fixed to the arms 112 of the bridge are aeration devices 117 and pumps 118, which are moved through the circular tanks 116a to 116f filled with sewage. They aerate the mixture of sewage and sludge, keep the sludge in suspension and transport the excess sludge from one tank to the other. The aeration devices 117 are fixed symmetrically on the diammetrically extending arm. This arm is shown to a larger scale in Figs. 11 and 12. In addition to the aeration boxes 117 which are located on two opposite arms, these arms also have thereon conveyor devices 121 which have a siphon action and which move the sludge opposite to the direction of flow from one circular tank into the next inwardly disposed tank. As will be seen from Fig. 8, these siphon devices 118 are for example arranged in such manner that the siphon device arranged on one of the arms 112 conveys the sludge from the clarifying tank 116f into the aeration tank 116e, while another arm has a conveyor device arranged thereon which conveys from the aeration tank 116e into the tank 116d. In this way, the siphon devices alternate until the sludge which has initially been deposited in the outermost circular tank 116f is conveyed through all circular tanks 116e to 116a in succession and in a direction opposite to the general direction of flow and finally passes into the funnel-shaped tank 107.

Rotary blowers 115 for air having a comparatively low pressure and possibly also a compressor are arranged on the bridge, if the pumps are designed as air lift pumps. The bridge is made of steel tubes, the cavities of which serve for transporting the air. Located at the end of the last circular tank is a floating adjustable removing device 129 for discharging the purified waste water.

Figure 12:
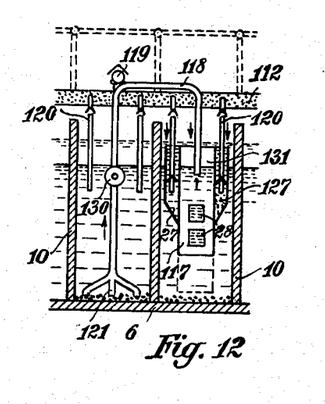
Fig. 12 is a vertical section through the part of the installation according to Fig. 11, the section being at right-angles to that of Fig. 11.

The outermost circular tank is not supplied with air. The sludge which settles in this tank is lifted over into the circular tank 116e by means of the siphon conveyor device 118 with a pump 130 (Fig. 12). Since the water from the entrance point of the last aerated circular tank to the discharge device 129 has a comparatively long travel and requires a relatively long time for this purpose, the sludge is deposited on the bottom and is pumped over from this point at short time intervals by the travelling siphon tube 118 with the pump 130 into the next innermost circular tank 116e. By means of the adjustable discharge device for a discharge flow which is uniform throughout the 24 hours of a day, the quantity of water, which is formed during the day when the accumulation of waste water is larger than average, is collected in all the tanks. During the day, the water level rises. During the night, when the supply of waste water is low, this level drops until the lowest level is reached in the early hours of the morning. By this means, the installation is uniformly loaded throughout 24 hours.

Figure 11:
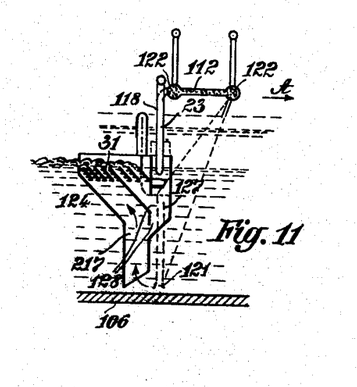
Fig. 11 is a vertical section through part of the installation according to Figs. 7 and 8 but to a larger scale.

As will be seen from Figs. 11 and 12, the rotating bridge 112 turns in the direction of the arrow A. The longitudinal arms of the bridge are constructed as air pipes 122. Aeration pipes 120 (Fig. 12), which can be shut off extend from the rotary bridge into the waste water to be clarified and into the aeration devices constructed in the form of boxes. These float on and in the said water and are held in the correct position by the air supply pipes 120. The flowing water forces them against the rotating bridge and causes the latter to move. A duct 127 extends from the upper part of the aeration device until in the vicinity of the bottom of the annular tank; the duct 127 terminates in an inclined opening projecting in the direction of movement of the rotary member. The result achieved by this means is that the waste water in this duct formed inside the aeration device rises as soon as waste water is conveyed from the aeration boxes into the tank. In the upper part of the aeration device, tubes 124 are arranged horizontally about 10 to 15 cm. above the water level. The above-described baffle plates with teeth or projections (see Fig. 13) are provided on these tubes formed with air-outlet openings.

The tubes 124 serving for the supply of air are fixed at both ends in air-tight manner in the upper container 127 of the aeration boxes 217. The air is supplied to the containers by way of the pipes 120. If air is blown into the aeration devices 217, the water is displaced from the containers 127 to such an extent that the air can enter the tubes 124 and causes the flow and aeration of the sludge and waste water mixture through the outlet openings 125.

The arrangement of the siphon 18 is shown in Fig. 12. This siphon device is substantially in the form of a U-shaped tube and is rigidly connected to the rotating bridge 112. At its end 121, it extends until in the vicinity of the base of one of the circular tanks, while at its other end it extends into a chamber of an aeration box 127. In order to take up the sludge over a largest possible bottom area, the end extending as far as the bottom is provided with branches. Arranged at a certain height in the U-tube is a pump 130 which is driven by an electric motor 119. By means of the pump 130, the sludge which has settled on the bottom of a circular tank is drawn up in admixture with waste water and conducted into a chamber 131 of the aeration device 127, the said chamber being open at the top. The mixture of sludge and waste water is aerated herein and conveyed towards the surface of the tank.

Once the siphon pipe 118 is filled with waste water by the pumps 130, the sludge then flows into the part 131 of the aeration box in proportion as mixture of waste water and sludge is expelled by aeration. In order to achieve an increased flow in the siphon pipes and thus an improved movement of sludge, even without pumps, the siphon pipes can also be briefly operated as mammoth pumps. For this purpose, compressed air is introduced into the lower part of the siphon pipe. For a small sludge delivery, air must be evacuated from the upper U-bends.

It is not necessary for the aeration devices to be arranged in a floating manner. They can also be arranged fast in the tank or on the rotating bridge 112. For this purpose, the fans are driven by variable-speed motors, and regulate the same according to the greater or smaller accumulated height above the air outlet openings. The speed and thus the air pressure is increased or lowered according to a higher or lower accumulated height. The air supply to the aeration device then becomes more simply.

Figure 9:
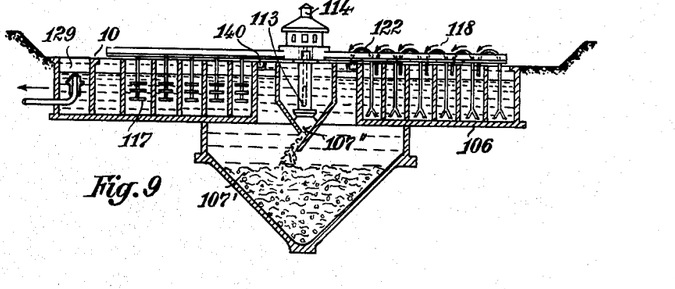
Figure 10:
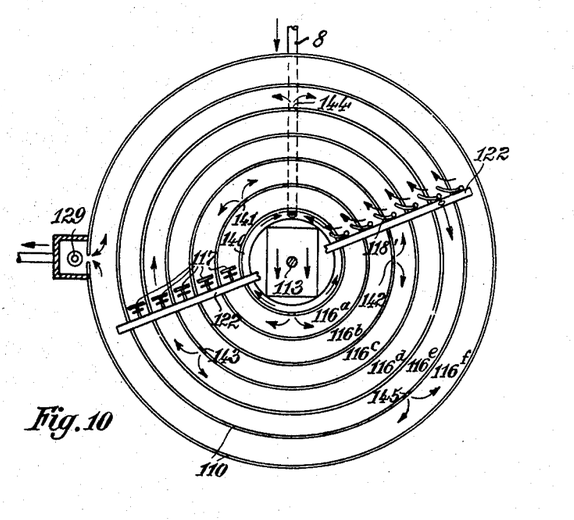
Fig. 10 is a top plan view of another constructional form of a combined mechanical and biological purification plant using the activated sludge process.

Figs. 9 and 10 show another constructional example of the activated sludge installation according to the invention for small quantities of waste water, these figures being a vertical section and plan view respectively. In principle, the arrangement and the physical and biological working operation of this installation is the same as that described with reference to Figs. 7 and 8. Unlike this latter arrangement, a separate sludge digesting chamber 107' is provided for the storage and for the digestion of the sludge, while a settling trough 107" for separating out the larger impurities and the excess sludge is provided in the upper part thereof.

Installed centrally of the installation is the pivot shaft 113 and the rotary stage for the equipment for machines. Connected to the rotary stage for the air supply is a two-armed hollow girder 122, on which are fixed the aeration devices 117 and the sludge pumps 118. Dipping partly into the upper sludge digestion chamber is a circulation trough 140 on the inside of the inner boundary wall of the first aeration tank. The sludge pump of the first aeration tank 116a delivers the excess sludge into this trough 140. From the latter, the sludge passes through an opening into the front part of the trough 107" and is mixed with the water from the supply pipe 108. The mixture flows through the trough 107" and passes through an opening into the first aeration tank 116a. The further flow of the waste water is the same as that in the installation according to Figs. 7 and 8 and as is also indicated in Fig. 10 by arrows. Owing to the liquid friction, the discharge from the connecting openings 141 to 145 of the aeration troughs does not take place uniformly towards both sides. According to practical experience, the supply and discharge arrangements 41, 42, 43, 44, 45 are arranged staggered relatively to one another by more or less than 180°.

Waste water can also be stored up in the installation according to Figs. 9 and 10. Floating aeration devices are not provided, because the compressed air at high pressure is injected near the bottom of the tank. Distributors for the ascending air bubbles can also be arranged on the air supply pipes 117 lying in the said water, the distributors retarding the ascent of the air bubbles, splitting them up and reforming them and thereby causing the injected air oxygen to be better utilised. The differences in water level which occur reduce or increase the amount there supplied, but this can in any case be regulated.

With the installations according to Figs. 7 and 10, it is possible for one of the aeration tanks to be supplied at any point with substances which assist the purification, for example, precipitation agents, final digested sludge, asbestos fibres and the like. The precipitation or added substances, which serve as a structure of the micro-organisms, then migrate positively to the foremost sludge tanks.

With the arrangement described, it is also possible for other aeration arrangements, brushes, compressed air supply in the region of the bottom of the tank and the like, to be provided or it is also possible to forego the building up of the waste water.

The invention is also of advantage for long tanks in order to return the sludge towards the sludge sump at the entrance in a direction opposite to the direction of flow of the water. In order to achieve this effect, the long tank is subdivided by transverse walls; the bottom is then provided on the opposite side of aeration device with a steadying zone with a funnel-shaped bottom depression. Extending into the latter are separate suction pipes which are connected to a main suction pipe extending through the tank, draw off the sludge accumulated in the funnel apex and lead it into the preceding tank. The overflow to the following tank is formed in the transverse wall within the steadying zone. This arrangement corresponds to the arrangement shown diagrammatically in Fig. 15. 68' represents the return device for the concentrated mixture of sludge and waste water to the preceding tank; 51' is the overflow to the following tank. 52' is the funnel-shaped depression of the steadying zone.

In view of the simple constructions, the few pipe connections and the like and the low cost for aeration, the building and operating costs of the installation are lower, while the purifying action is greater than with the known installations owing to the use of the counter-flow principle used in the movement of waste water and sludge.

I claim:

1. Process for the continuous combined mechanical and biological purification of sewage containing coarse and fine solid impurities and supplied at a non-uniform rate, comprising the following steps: mechanically separating the sewage in a first stage into waster water, free of coarse solid impurities, and coarse sludge comprising coarse solid impurities; passing the coarse sludge into a digestion stage; treating said waste water free of coarse solid impurities in an additional mechanical separation stage whereby contained fine impurities are separated out as fine sludge; passing the fine sludge into the aforementioned digestion stage and passing the waste water free of fine impurities into a storage zone; removing waste water free of fine impurities from said storage zone at a uniform hourly rate during the entire twenty-four hours of each day; introducing a portion of the waste water so removed into a biological purification zone having a short detention period, and the remaining portion into a separate biological purification zone having a long detention period, and thereby forming activated sludge in said last mentioned zone; removing waste water from said short detention zone and using the same to dilute the above mentioned waste water free of coarse solid impurities; passing from said long detention zone waste water containing activated sludge into a clarifying stage wherein the activated sludge is segregated from the clarified waste water, and recycling activated sludge so segregated and clarified waste water into the aforementioned waste water free of coarse solid impurities to further dilute the same, and thereby control the conditions in the biological purification zone to form a sludge that can be easily flushed off.

2. Process according to claim 1, wherein a rise of level in the additional separation stage causes the separated fine sludge to be removed into a collecting zone, while a lowering of the level causes the fine sludge to be transferred from the collecting zone into the digestion stage.

3. Process according to claim 1, wherein the biological purification is carried out in a trickling filter.

References Cited in the file of this patent

UNITED STATES PATENTS

| | | |
|---|---|---|
| 840,179 | Vogelsang | Jan. 1, 1907 |
| 1,902,171 | Kopp | Mar. 21, 1933 |
| 2,141,979 | Halvorson et al. | Dec. 27, 1938 |
| 2,258,398 | Ward | Oct. 7, 1941 |
| 2,348,126 | Green | May 2, 1944 |
| 2,442,432 | Prager | June 1, 1948 |
| 2,562,510 | Schlenz | July 31, 1951 |
| 2,588,475 | Bolton | Mar. 11, 1952 |
| 2,786,025 | Lamb et al. | Mar. 19, 1957 |

UNITED STATES PATENT OFFICE
CERTIFICATION OF CORRECTION

Patent No. 2,963,430                                         December 6, 1960

August Schreiber

It is hereby certified that error appears in the above numbered patent requiring correction and that the said Letters Patent should read as corrected below.

Column 3, line 66, after "settling" insert -- chambers --; column 6, line 11, after "also" insert -- be --.

Signed and sealed this 9th day of May 1961.

(SEAL)

Attest:

ERNEST W. SWIDER                                          DAVID L. LADD
Attesting Officer                                            Commissioner of Patents